United States Patent
Beutler et al.

(10) Patent No.: US 7,809,863 B2
(45) Date of Patent: Oct. 5, 2010

(54) MONITOR PROCESSOR AUTHENTICATION KEY FOR CRITICAL DATA

(75) Inventors: Arthur D. Beutler, Phoenix, AZ (US); Larry E. Gronhovd, Glendale, AZ (US); Kevin L. Kriebs, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 140 days.

(21) Appl. No.: 11/595,579

(22) Filed: Nov. 8, 2006

(65) Prior Publication Data

US 2008/0109642 A1    May 8, 2008

(51) Int. Cl.
*G06F 3/00* (2006.01)
*G06F 5/00* (2006.01)
*G06F 13/00* (2006.01)
*G06F 12/00* (2006.01)
*G06F 13/14* (2006.01)
*G06F 13/38* (2006.01)

(52) U.S. Cl. .................. 710/36; 710/107; 710/108; 710/241

(58) Field of Classification Search ............. 710/5, 710/36, 107, 108, 241
See application file for complete search history.

(56) References Cited

U.S. PATENT DOCUMENTS

| 4,227,253 | A | * | 10/1980 | Ehrsam et al. | 380/45 |
| 4,528,662 | A | * | 7/1985 | Floyd et al. | 370/216 |
| 5,073,932 | A | * | 12/1991 | Yossifor et al. | 380/270 |
| 5,467,359 | A | * | 11/1995 | Huon et al. | 714/755 |
| 5,493,497 | A | * | 2/1996 | Buus | 701/4 |
| 5,671,237 | A | * | 9/1997 | Zook | 714/755 |
| 6,467,060 | B1 | * | 10/2002 | Malakapalli et al. | 714/758 |
| 6,948,091 | B2 | * | 9/2005 | Bartels et al. | 714/11 |

* cited by examiner

*Primary Examiner*—Niketa I Patel
*Assistant Examiner*—Farley J Abad
(74) *Attorney, Agent, or Firm*—Ingrassia Fisher & Lorenz, P.C.

(57) ABSTRACT

A command generating and monitoring system includes a command processor configured to determine a command data set from a command input. A monitoring processor is coupled to the command processor and is configured to generate an authentication key by comparing the command data set received from the command processor to a comparison command data set generated by the monitoring processor. A data bus is coupled to the command processor and the monitoring processor. The data bus is configured to receive the command data set and the authentication key for retrieval by a consuming device.

20 Claims, 5 Drawing Sheets

MONITOR PROCESSOR AUTHENTICATION KEY FOR CRITICAL DATA

FIELD OF THE INVENTION

The present invention generally relates to the field of redundancy management in computer architecture and, more particularly, to a monitor processor authentication key for critical data.

BACKGROUND OF THE INVENTION

In many different situations, critical data generated by a processor needs to be checked for accuracy to ensure the processor is not producing erroneous data due to a fault such as an internal error in the processor. For example, in one known system, a monitoring processor receives commands generated by a command processor and compares them to commands independently generated by the monitoring processor. In a typical embodiment, upon detection of an error by the monitoring processor, the communication bus to which the command processor is coupled to is shutdown.

In modern systems, multiple functions and processes are operated on a single processor. In current fault checking systems, if an error is detected in one function, the communication bus is shutdown. While this prevents the use of erroneous commands or data in one function or process, it also deprives other operating functions and processes from receiving data and commands.

Accordingly, it is desirable to provide a monitor processor authentication key for critical data to allow individual processes and functions to reject faulty data while allowing the continued operation of other processes and functions. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one embodiment of the present invention, a command generating sub-system incorporating a command processor is configured to determine a command data set from a command input. A monitoring processor is coupled to the command processor and is configured to generate an authentication key by comparing the command data set received from the command processor to a comparison command data set generated by the monitoring processor. A data bus is coupled to the command processor and the monitoring processor. The data bus is configured to receive the command data set and the authentication key for retrieval by a consuming device.

In another embodiment, a method for verifying processor generated commands includes a first step of generating a first command data set at a command processor. Next, the first command data set is received at a monitoring processor. Then, a second command data set is generated at the monitoring processor. Then first command data set and the second command data set are compared at the monitoring processor. An authentication key indicative of a valid match between the first command data set and the second command data set is then generated and sent to a consuming device via a common I/O section and a data bus.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
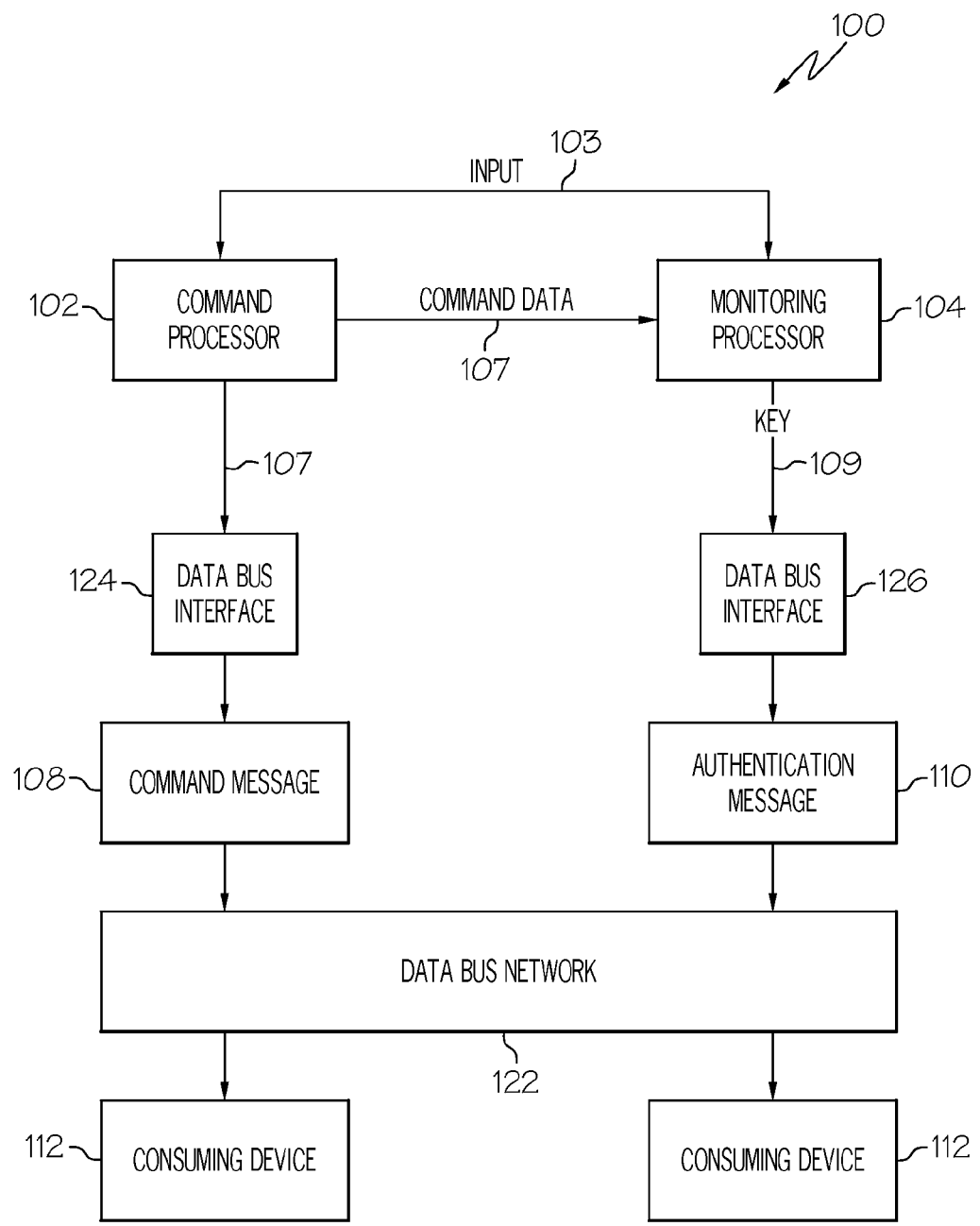
FIG. 1 is an exemplary embodiment of a command monitoring processing system in accordance with an exemplary embodiment of the present invention.

FIG. 1 illustrates a command generating and monitoring system 100. System 100 generates commands and data based on the reception of input data. The commands and data can be used by other subsystems. System 100, in the exemplary embodiment of FIG. 1, comprises a command processor 102 and a monitoring processor 104. A data bus network 122 is coupled to the command processor 102 via a first data bus interface 124 and is coupled to the monitoring processor 104 via a second data bus interface 126.

Command processor 102 generates data or commands to be used by one or more consuming devices 112 from inputs 103 received by the command processor 102. Inputs 103 can be generated, for example, in an avionics embodiment, by a pilot manipulating the controls of an aircraft and may be conveyed over the same data bus network as used for the commands. The inputs 103 can be received by the command processor 102, which then generates command data 107 comprising data and/or commands to be used by an avionics subsystem. Command processor 102 can be any processor commonly used for command and/or data generation and can include a processor and any necessary supporting architecture.

Monitoring processor 104 which can be the same type of processor as the command processor 102 or can be a different type of processor (as would be the case for applications in which processor design errors are a concern), receives command data 107 from the command processor 102. The monitoring processor 104 uses the same inputs 103 as received by the command processor 102 to generate independently the data and/or commands of the command data 107 based on the inputs 103. Monitoring processor 104 further compares the command data 107 received from the command processor 102 to the internally generated data and/or commands and generates authentication key 109. The authentication key 109 can be any data that indicates whether a comparison was successful. The authentication key 109 can comprise validity flags, time varying heart beat, characteristics of data such as cyclic redundancy checks (CRCs), and the like.

The first data bus interface 124 couples command processor 102 to the data bus network 122. The first data bus interface 124 receives the command data 107 from the command processor 102 and converts the command data 107 to a command message 108 that can then be sent to the data bus network 122. Similarly, the second data bus interface 126 couples the monitoring processor 104 to the data bus network 122. The second data bus interface 126 converts the received authentication key 109 to an authentication message 110 for presentation to data bus network 122.

Consuming device 112, which can be any system or sub-system configured to utilize the command messages 108, retrieve command messages 108 and authentication messages 110 from the data bus network 122. The command messages 108 are discarded if the authentication message 110 indicates an erroneous command message 108. In one exemplary embodiment, if the authentication key 109 is a CRC generated by the monitoring processor 104 computed over the data/command set received from the command processor 102, inconsistency between the CRC and the command data 107 can be indicative of a failure in first data bus interfaces 124, second data bus interface 126, or data bus network 122.

In an exemplary embodiment, each producing device, such as the command processor 102 and monitoring processor 104, transmits messages onto the data bus network 122 according to a predetermined time sequence, similar to a time division multiplex access system (TDMA). For example, each producing device can be assigned a time slot within a series of time slots during which the producing device can transmit command messages 108 and authentication messages 110 to the data bus network 122. In another exemplary embodiment, each producing device transmits on a dedicated point to point data bus wherein a single transmitter broadcasts to a plurality of consuming devices 112.

Figure 2:
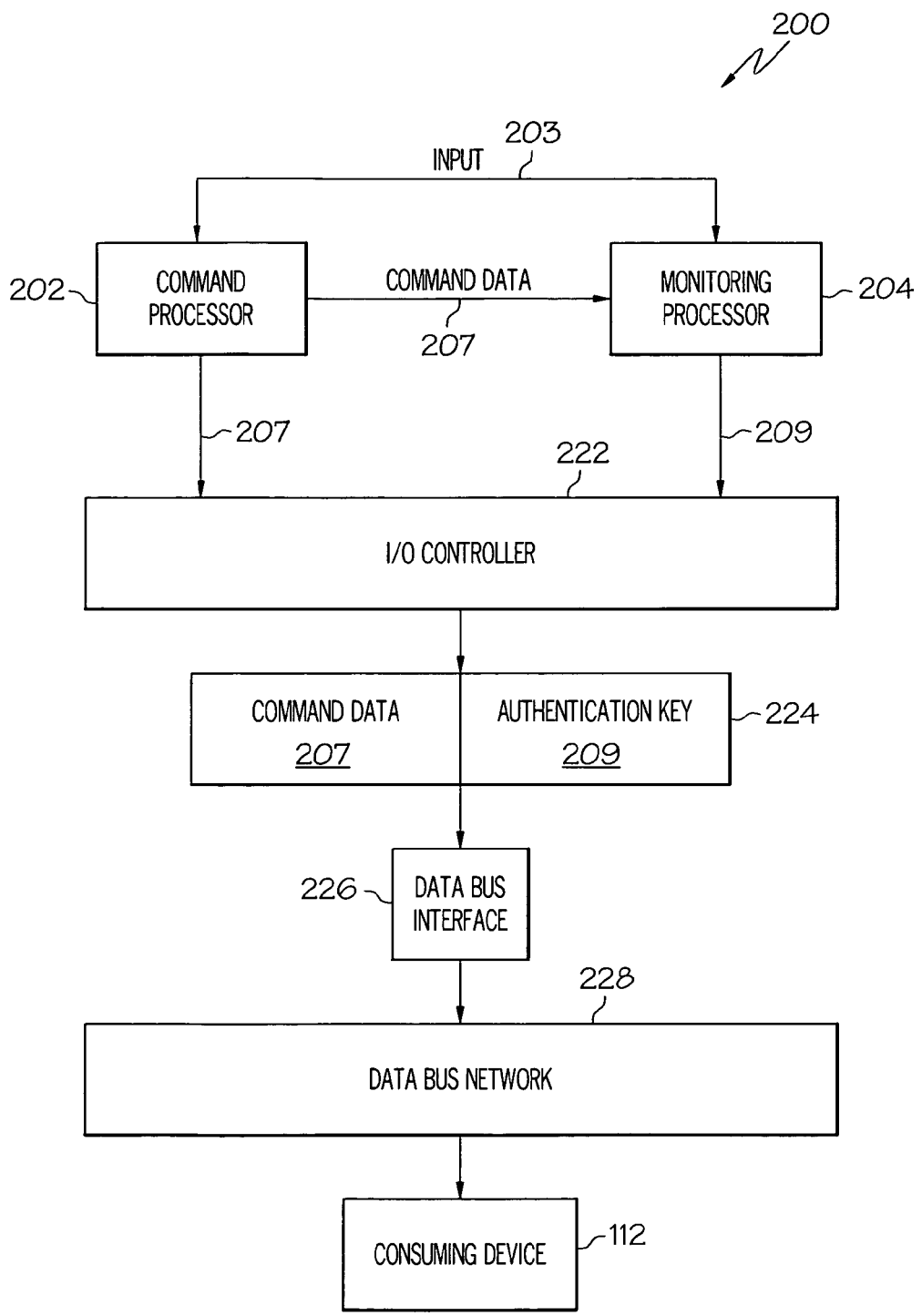
FIG. 2 is another exemplary embodiment of a command monitoring processing system in accordance with an exemplary embodiment of the present invention.

FIG. 2 illustrates an alternative embodiment of a command generating and monitoring system 200. System 200, in the exemplary embodiment illustrated in conjunction with FIG. 2, includes a command processor 202 and a monitoring processor 204. An I/O controller 222 couples to a data bus interface 226 which couples to the data bus network 228. Consuming devices 112, as previously discussed, are also coupled to the data bus network 228.

In the exemplary embodiment of FIG. 2, and as discussed in conjunction with FIG. 1, command processor 202 generates data or commands to be used by one or more consuming devices 112 from inputs 203 received by the command processor 202. As noted above, the input data may be conveyed over the same data bus network as used for the commands. Monitoring processor 204, which can be the same type of processor as the command processor 202 or can be a different type of processor (as would be the case for applications in which processor design errors are a concern) receives command data 207 from the command processor 202. The monitoring processor 204 uses the same inputs 203 as received by the command processor 202 to generate independently the data and/or commands of the command data 207 based on the inputs 203. Monitoring processor 204 further compares the command data 207 received from the command processor 202 to the internally generated data and/or commands and generates authentication key 209. The authentication key 209 can be any data that indicates whether a comparison was successful. The command data 207 generated by the command processor 202 and the authentication key 209 generated by the monitoring processor 204, by comparing the command data 207 generated by the command processor 202 with internally generated commands and data, is output first to I/O controller 222.

The I/O controller 222 combines the command data 207 and the authentication key 209 into message packets 224. Once the message packets 224 are generated by the I/O controller 222 they are sent to the data bus interface 226 which then places the message packets 224 on to the data bus network 228. The message packets 224 can be addressed to specific consuming systems 112, with each consuming device 112 receiving message packets 224 from the data bus network 228 intended for that consuming device 112.

After the consuming device 112 receives the message packets 224, the consuming device 112 can then check the authentication portion of each message and determine if the authentication key 209 within the message packet 224 indicates the command data 207 was verified as correct by the monitoring processor 204. If the authentication key 209 indicates correct command data 207, the command data 207 can be used by the consuming device 112. If not, the command data 207 can be discarded by the consuming device 112. In one exemplary embodiment, if the authentication key 209 is a CRC generated by the monitoring processor 204 computed over the data/command set received from the command processor 202, inconsistency between the CRC and the command data 207 can be indicative of a failure in data bus interfaces 226 or data bus 228.

Figure 3:
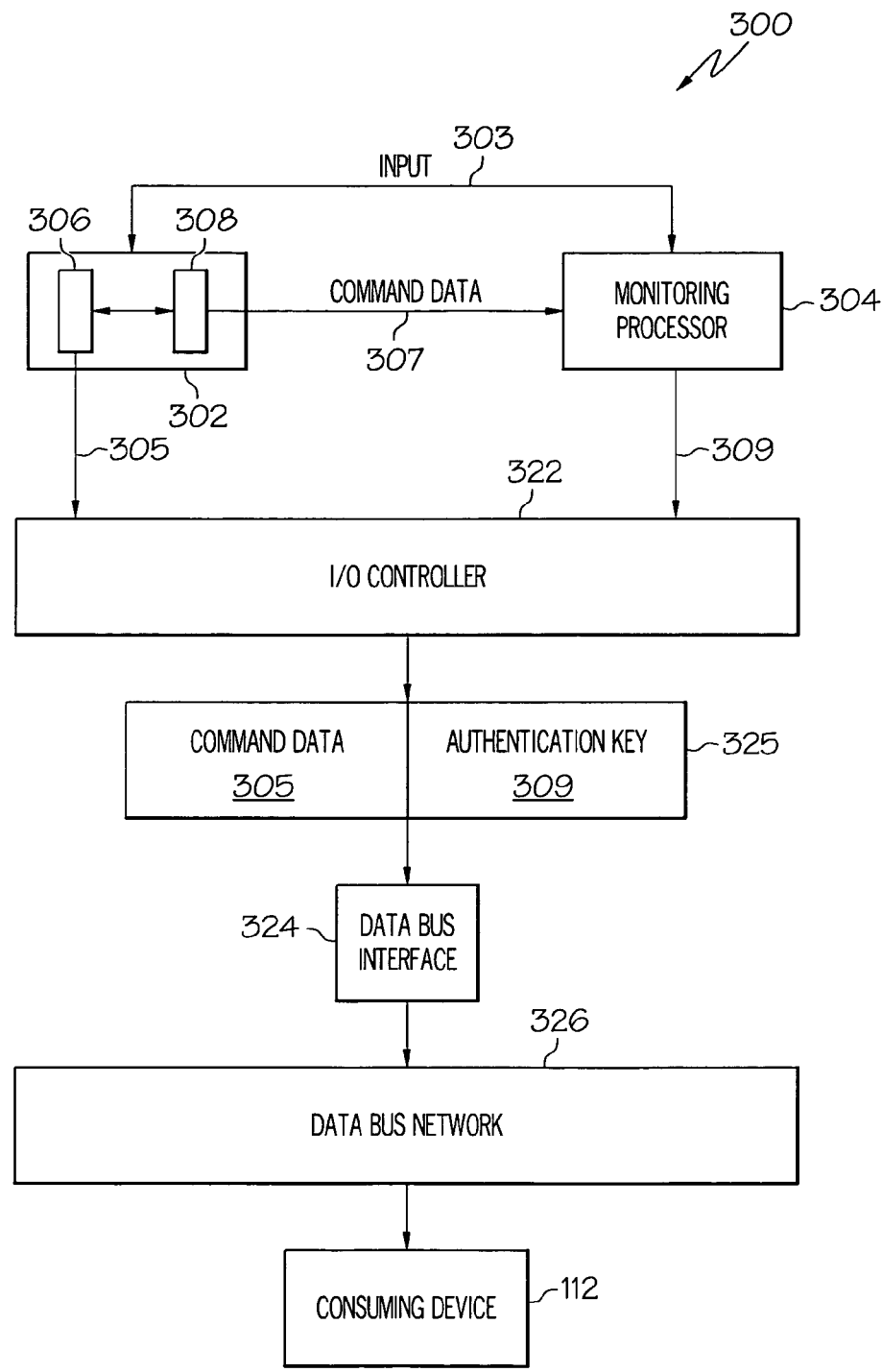
FIG. 3 is another exemplary embodiment of a command monitoring processing system with a command processor utilizing self checking processing lanes in accordance with an exemplary embodiment of the present invention.

FIG. 3 illustrates a third embodiment of a command generating and monitoring system 300. In the exemplary embodiment of FIG. 3, system 300 comprises a command processor 302, which includes a first processing lane 306 and a second processing lane 308. In one exemplary embodiment, first processing lane 306 and second processing lane 308 comprise the same processor type operating in a lockstep method. That is, the first processing lane 306 and second processing lane 308 are perform the same computations with the outputs compared with each other to ensure the results match. A first command data 305 of the first processing lane 306 is received by an I/O controller 322. A second command data 307 from the second processing lane 308 is received by, in one exemplary embodiment, a dissimilar monitoring processor 304, which produces an authentication key 309 that is sent to the I/O controller 322.

The I/O controller 322 is coupled to a data bus interface 324, which in turn couples to a data bus network 326. A plurality of consuming devices 112 also couple to the data bus network 326.

In operation, the monitoring processor 304 and command processor 302 receive an input set 303. This input data may be conveyed over the same data bus network as used for the commands. First processing lane 306 and second processing lane 308 of the command processor 302 generate first command data 305 and second command data 307 respectively based on the inputs 303. As before the first command data 305 and second command data 307 can be generated commands, generated data or both commands and data. If there is no failure in either processing lane, the first command data 305 and the second command data 307 should match. The monitoring processor 304 processes the initial input 303 to generate commands and/or data. The commands and/or data generated by the monitoring processor 304 are compared to the second command data 307 generated by the second processing lane 308 of the command processor 302 to produce authentication key 309. In an exemplary embodiment, the authentication key 309 indicates a successful or unsuccessful match between the commands and/or data received by the monitoring processor 304 from the second processing lane 308 and the commands and/or data generated by the monitoring processor 304.

If the authentication key 309 includes a CRC generated based on data 307 received from the command processor 302, any divergence between first command data 305 and second command data 307 will result in an inconsistency between the received CRC and the command data set and thus provides an additional means of detection of divergence between first processing lane 306 and second processing lane 308.

In the exemplary embodiment of FIG. 3, the first command data 305 from the first processing lane 306 and the authentication key 309 from the monitoring processor 304 is received by I/O controller 322, which converts the command data 305 and authentication key 309 into a message 325 comprising a plurality of data packets that are sent to the specific consuming devices 112 as described in conjunction with FIG. 2. In an alternative embodiment, command data 305 and authentication key 309 can be placed on a TDMA data bus network 326 in dedicated time slots for retrieval by the consuming device 112 configured to select data from the data bus network 326 at a set interval as described in conjunction with the embodiment of FIG. 1.

Figure 4:
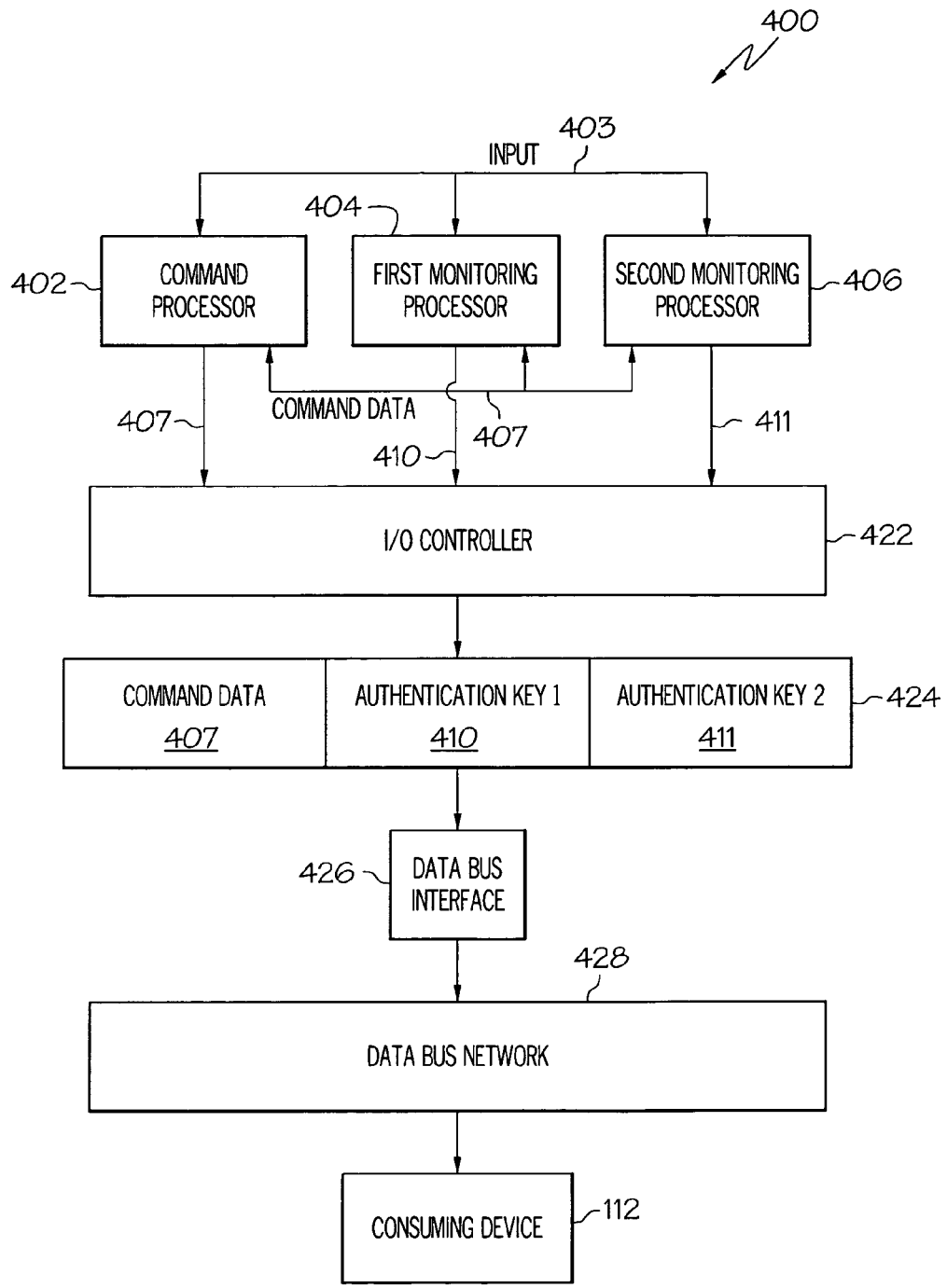
FIG. 4 is another exemplary embodiment of a command monitoring processing system utilizing multiple monitoring processors in accordance with an exemplary embodiment of the present invention.

FIG. 4 illustrates another exemplary embodiment of a command generating and monitoring system 400. System 400 comprises a command processor 402 coupled to a first monitoring processor 404 and a second monitoring processor 406. In an exemplary embodiment, each of the processors 402-406 will be different types of processors to provide for the detection of a processor design error.

Similar to the embodiments discussed previously, command processor 402 receives input data 403 and generates command data 407, which can comprise commands and/or data. In the exemplary embodiment of FIG. 4, the command data 407 is sent to the first monitoring processor 404, the second monitoring processor 406, and an I/O controller 422. As before, first monitoring processor 404 and second monitoring processor 406 receives the same input data 403 and generates commands and data from the input data 403. The first monitoring processor 404 and the second monitoring processor 406 compare the results to the command data 407 generated by the command processor 402. After the comparison is made, first monitoring processor 404 and second monitoring processor 406 generates a first authentication key 410 and a second authentication key 411 respectively. If the commands and the data match, the first authentication key 410 or the second authentication key 411 will reflect a successful authentication. If the commands and data do not match, the first authentication key 410 and the second authentication key 411 will reflect the failure to match. The first authentication key 410 and the second authentication key 411 can be sent to the I/O controller 422.

First monitoring processor 404 and second monitoring processor 406 of dissimilar types afford protection against design faults in either first monitoring processor 404 and second monitoring processor 406, which would result in failure to generate a valid authentication key. Protection against design faults in the command processor 402 is provided by use of multiple instances of the processing subsystem with different processor types fulfilling different roles amongst those instances.

In an exemplary embodiment of the present invention, the I/O controller 422 assembles the command data 407, the first authentication key 410 and the second authentication key 411 into a single message packet 424 comprising one or more data packets.

In an alternative embodiment, the command data 407 and the first authentication key 410 and the second authentication key 411 can be placed directly on to the data bus network 428. Consuming devices 112 can then retrieve data at regular intervals, as discussed in conjunction with FIG. 1.

In either embodiment, if either the first authentication key 410 and the second authentication key 411 are valid then the commands and/or data in the command data 407 can be used by the consuming device 112. If first authentication key 410 or second authentication key 411 is valid and the other is not valid, the command and/or data can be used and it can be presumed that an error occurred in the monitoring processor that generated the invalid authentication key. Given dissimilar processor types, an isolated invalid authentication key could result from a processor design error (such as a generic processor failure). In the case where both first authentication key 410 and second authentication key 411 are both invalid, an error in the generation of the command data 407 is presumed and the command data 407 is not used by the consuming devices 112.

Figure 5:
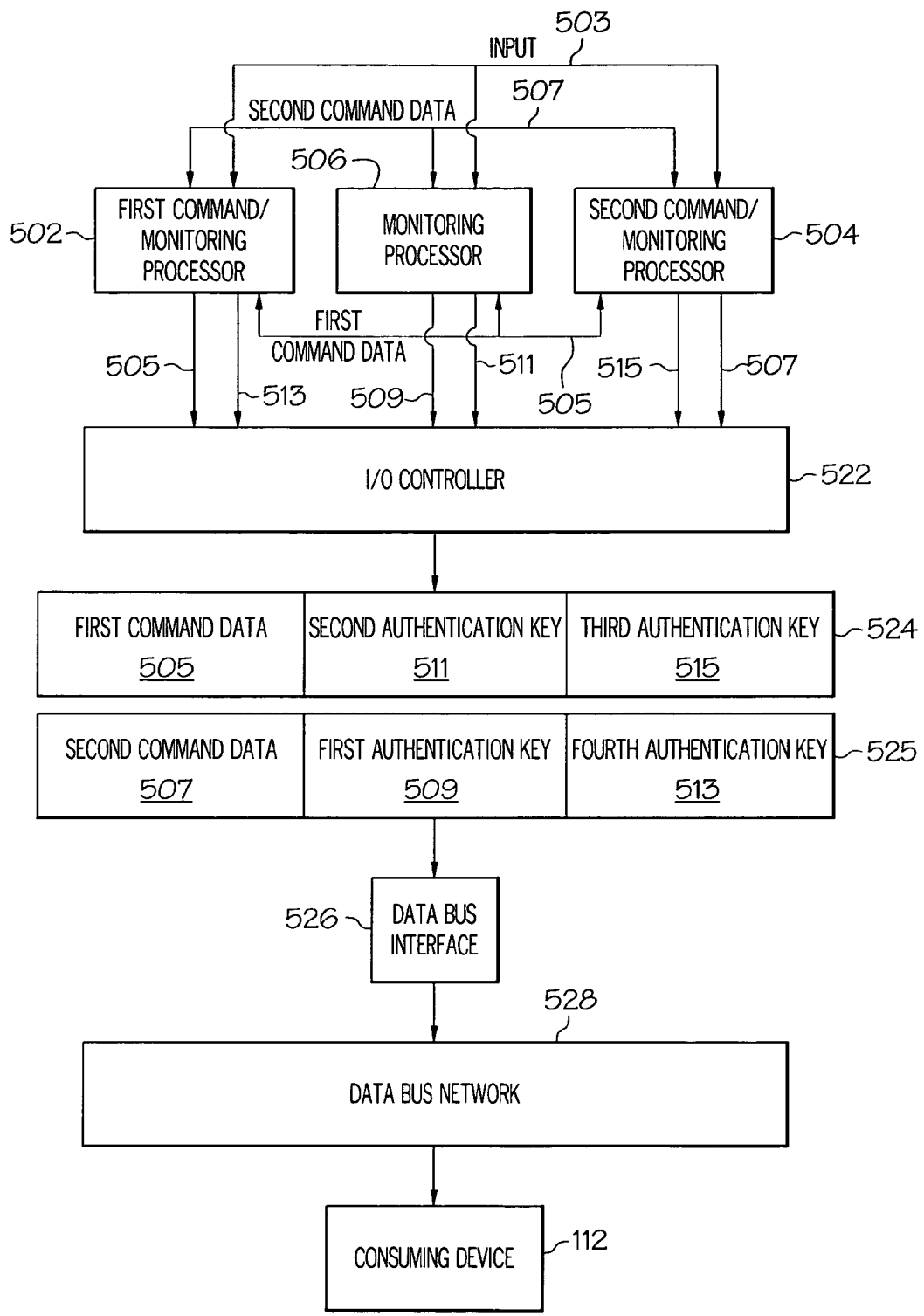
FIG. 5 is another exemplary embodiment of a command monitoring processing system utilizing multiple monitoring processors in accordance with an exemplary embodiment of the present invention.

FIG. 5 illustrates another exemplary embodiment of the present invention. System 500 of FIG. 5 comprises a first command/monitoring processor 502, a second command/monitoring processor 504, and a monitoring processor 506, all of which are coupled. As in the previous triple processor embodiment (FIG. 4), each processor is generally of a different type. Each of the processors output to the I/O controller 522 which is coupled to a data bus interface 526 and a data bus network 528.

In this exemplary embodiment, the first command/monitoring processor 502 receives data inputs 503 to generate first command data 505, which can comprise commands and/or data. The first command data 505 is sent to the I/O controller 522, the monitoring processor 506 and the second command/monitoring processor 504. The second command/monitoring processor 504 receives the same data inputs 503 and generates a second command data 507. The second command data 507 is sent to first command/monitoring processor 502, monitoring processor 506, and the I/O controller 522.

The monitoring processor 506 also receives the data input 503 and independently determines the commands and/or data from the input 503. The monitoring processor 506 compares the internally computed commands and/or data to the first command data 505 and the second command data 507 to generate a first authentication key 509 and a second authentication key 511, respectively. The authentication keys 509 and 511 are indicative of whether the internally generated commands and/or data match the first command data 505 and the second command data 507, respectively.

The first command/monitoring processor 502 also receives the second command data 507. The first command/monitoring processor 502 compares the first command data 505 with the second command data 507 and generates a fourth authentication key 513 indicative of whether the first command data 505 and the second command data 507 match. Also, the second command/monitoring processor 504 receives the first command data 505 and compares it with the second command data 507 and generates a third authentication key 515. The fourth authentication key 513 and the third authentication key 515 are sent to the I/O controller 522.

The I/O controller 522 generates a first command message 524 and a second command message 525 from the first command data 505, the second command data 507, the first authentication key 509, the second authentication key 511, the fourth authentication key 513, and the third authentication key 515. First command message 524 comprises the first command data 505, the second authentication key 511, and the third authentication key 515. The second command message 525 comprises the second command data 507, the first authentication key 509, and the fourth authentication key 513. The first command message 524 and the second command message 525 are sent to the consuming devices 112 via the data bus interface 526 and data bus network 528. The consuming devices 112 can use either (or both) command data 505, 507 when at least one of the authentication keys 509-515 within the command message 524, 525 indicates a valid command data 505, 507. If the authentication key is a CRC or similar checkword, at least one command message 524 or 525 must have at least one authentication key which matches the command data for it to be used by the consuming device. As discussed previously, given that each of the processors 502-506 is different, the systems can detect generic processor faults in the event of one of the pairs of authentication messages indicating an invalid match when the other indicates a valid match. As discussed previously, instead of assembling messages at I/O controller 522, separate data bus interfaces can be provided to the first command monitoring processor 502, the second command monitoring processor 504, and the monitoring processor 506 similar to the embodiment as shown in FIG. 1.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A command generating and monitoring system comprising:
   a command processor configured to receive a command input and determine a first command data set based on the command input;
   a first monitoring processor coupled to the command processor and configured to:
      receive the command input,
      determine a second command data set based on the command input,
      receive the first command data set,
      compare the first command data set and the second command data set,
      determine if the first command data set is identical to the second command data set,
      generate a first authentication key based on the comparison,
         wherein, the first authentication key is a valid first authentication key if the first command data set is identical to the second command data set, and
         the first authentication key is an invalid first authentication key if the first command data set is not identical to the second command data set; and
   a data bus coupled to the command processor and the first monitoring processor, the data bus configured to receive the first command data set and either the valid first authentication key or the invalid first authentication key for retrieval by a consuming device.

2. The system of claim 1 further comprising a first data bus interface coupled to the command processor and a second data bus interface coupled to the first monitoring processor, the first data bus interface and the second data bus interface configured to place the first command data set and the first authentication key on the data bus for retrieval by the consuming device during a set time slot.

3. The system of claim 2 wherein the first authentication key is a cyclic redundancy check (CRC) and wherein inconsistency between the CRC and the first command data set is indicative of a divergence between the command processor and the first monitor processor, a failure in the first data bus interface, a failure in the second data bus interface or a failure of the data bus.

4. The system of claim 1, further comprising an I/O controller coupled to the command processor and the first monitoring processor, the I/O controller configured to assemble a message comprising the first command data set and the first authentication key.

5. The system of claim 4 wherein the command processor comprises a first processor lane operating in a lockstep manner with a second processor lane, the first processor lane configured to generate a first set of command data and the second processor lane configured to generate a second set of command data, wherein the first set of command data is received by the I/O controller and the second set of command data is received by the first monitoring processor, the first monitoring processor configured to generate the first authentication key by comparing the second set of command data with the second command data set generated by the first monitoring processor.

6. The system of claim 5 wherein the authentication key is a cyclic redundancy check (CRC) based on the second set of command data and wherein an inconsistency between the second set of command data and the CRC is indicative of either a divergence between the first processor lane and the second processor lane, a divergence between the command processor and the first monitor processor, a failure in a first data bus interface coupled between the command processor and the data bus, a failure in a second data bus interface coupled between the first monitor processor and the data bus, or a failure of the data bus.

7. The system of claim 1 further comprising a second monitoring processor coupled to the command processor, the second monitoring processor configured to generate a second authentication key, and wherein the data bus network is configured to deliver the first command data set and the first and second authentication keys to the consuming device.

8. The system of claim 7 wherein the consuming device is configured to discard the first command data set if the first and second authentication keys are indicative of a failure of a match between the first command data set from the first command processor and the second command data set generated by the second command processor.

9. A method for verifying processor generated commands comprising:
   receiving a command input at a command processor;
   generating a first command data set at the command processor based on the command input;
   receiving the first command data set at a first monitoring processor;
   receiving the command input at the first monitoring processor;
   generating a second command data set at the first monitoring processor based on the command input;
   comparing the first command data set and the second command data set at the first monitoring processor;

determining if the first command data set is identical to the second command data set, generating a first authentication key at the first monitoring processor indicative of a valid match between the first command data set and the second command data set based on the comparison of the first command data set and the second command data set, wherein, the first authentication key is a valid first authentication key if the first command data set is identical to the second command data set, and the first authentication key is an invalid first authentication key if the first command data set is not identical to the second command data set; and transmitting the first command data set and either the valid first authentication key or the invalid first authentication key to a consuming device via a data bus coupled to the command processor and the first monitoring processor.

10. The method of claim 9 further comprising placing the first command data set and the first authentication key on the data bus for retrieval by the consuming device during a set time slot.

11. The method of claim 10 wherein the step of generating the first authentication key further comprises generating a cyclic redundancy check (CRC) and wherein an inconsistency between the CRC and the first command data set is indicative of a divergence between the command processor and the first monitor processor, a failure in a first data bus interface coupled between the command processor and the data bus, a failure in a second data bus interface coupled between the monitor processor and the data bus, or a failure of the data bus.

12. The method of claim 9 further comprising assembling a message at an I/O controller, the message comprising the first command data set and the first authentication key.

13. The method of claim 9 wherein the step of generating the first command data set further comprises:
generating a first set of command data using a first processor lane of the command processor;
generating a second set of command data using a second processor lane of the command processor;
generating the first authentication key at the monitoring processor using the second set of command data; and
sending the first set of command data and the first authentication key to the data bus.

14. The method of claim 9 further comprising:
receiving the first command data set at a second monitoring processor;
receiving the command input at the second monitoring processor;
generating a third command data set at the second monitoring processor based on the command input;
comparing the first command data set and the third command data set at the second monitoring processor;
generating a second authentication key at the second monitoring processor indicative of a valid match between the first command data set and the third command data set based on the comparison of the first command data set and the third command data set; and
transmitting the first command data set, the first authentication key and the second authentication key to the consuming device via the data bus.

15. The method of claim 14 further comprising the step of discarding the first command data set if the first and second authentication keys are indicative of a failure of a match between the first command data set from the command processor and the second command data set generated by the first monitoring processor and a failure of a match between the first command data set from the command processor and the third command data set generated by the second monitoring processor.

16. The method of claim 9 wherein the command processor is a first command/monitoring processor, the method further comprising:
receiving the first command data set at a second command/monitoring processor;
receiving the command input at the second command/monitoring processor;
generating a third command data set at the second command/monitoring processor based on the command input;
comparing the first command data set and the third command data set at the second command/monitoring processor;
generating a second authentication key based on the comparison of the first command data set and the third data set at the second command/monitoring processor indicative of a valid match between the first command data set and the third command data set based on the comparison of the first command data set and the third command data set;
receiving the third command data set at the first monitoring processor;
comparing the second command data set and the third command data set at the first monitoring processor;
generating a third authentication key based on the comparison of the second command data set and the third data set at the first monitoring processor indicative of a valid match between the second command data set and the third command data set based on the comparison of the second command data set and the third command data set;
receiving the third command data set at the first command/monitoring processor;
comparing the first command data set and the third command data set at the first command/monitoring processor; and
generating a fourth authentication key based on the comparison of the first command data set and the third data set at the first command/monitoring processor indicative of a valid match between the first command data set and the third command data set based on the comparison of the first command data set and the third command data set.

17. The method of claim 16 further comprising:
assembling a first message comprising the first command data set, the second authentication key, and the third authentication key;
assembling a second message comprising the third command data set, the first authentication key and the fourth authentication key; and
transmitting the first and second message to the consuming device.

18. A command generating and monitoring system comprising:
a first command/monitoring processor configured to receive a command input and generate a first command data set based the command input;
a second command/monitoring processor coupled to the first command/monitoring processor, the second command/monitoring processor configured to:
receive the command input,
determine a second command data set based on the command input,
receive the first command data set, compare the first command data set and the second command data set determine if the first command data set is identical to the second command data set, and generate a first authentication key based on the comparison of the first command data set and the second command data set, wherein, the first authentication key is a valid first authentication key if the first command data set is identical to the second command data set, and the first authentication key is an invalid first authentication key if the first command data set is not identical to the second command data set; and a monitoring processor coupled to the first command/monitoring processor and the second command/monitoring processor, the monitoring processor configured to:

receive the command input, determine a third command data set based on the command input, receive the first command data set, compare the first command data set and the third command data set, generate a second authentication key based on the comparison of the first command data set and the third command data set, receive the second command data set, compare the second command data set and the third command data set, and generate a third authentication key based on the comparison of the second command data set and the third command data set.

19. The command generating and monitoring system of claim 18, wherein the first command/monitoring processor is further configured to:

receive the second command data set, compare the first command data set and the second command data set, and generate a fourth authentication key based on the comparison of the first command data set and the second command data set.

20. The command generating and monitoring system of claim 19, further comprising an I/O controller coupled to the first command/monitoring processor, the second command/monitoring processor, and the monitoring processor, the I/O controller configured to:

assemble a message comprising the first command data set, the second command data set, the first authentication key, the second authentication key, the third authentication key, and the fourth authentication key; and transmit said message to a consuming device.

* * * * *